United States Patent Office 3,773,762
Patented Nov. 20, 1973

3,773,762
2-INDOLYLACETIC ACID DERIVATIVES AND
PROCESS FOR PRODUCTION THEREOF
Masaru Nakao, Osaka, Shigenari Katayama, Takarazuka, and Hisao Yamamoto, Nishinomiya, Japan, assignors to Sumitomo Chemical Company, Ltd., Osaka, Japan
No Drawing. Continuation of abandoned application Ser. No. 861,449, Sept. 26, 1969. This application July 19, 1971, Ser. No. 164,125
Claims priority, application Japan, Oct. 8, 1968, 43/73,372; Oct. 15, 1968, 43/75,447; Mar. 31, 1969, 44/24,975; Apr. 1, 1969, 44/25,452; May 14, 1969, 44/37,204
Int. Cl. C07d 27/56
U.S. Cl. 260—240 J                  4 Claims

ABSTRACT OF THE DISCLOSURE

Anti-inflammatory, analgesic and anti-pyretic agents of the formula,

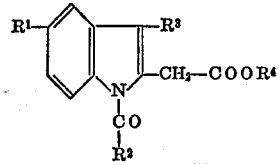

are produced by reacting an $N^1$-acylphenylhydrazine derivative of the formula,

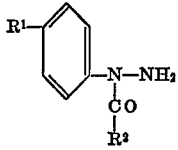

or a salt thereof, with a keto acid derivative of the formula, $$R^3\text{—}CH_2\text{—}CO\text{—}CH_2\text{—}COOR^4$$

or reacting a 2-indolylacetic acid ester derivative of the formula,

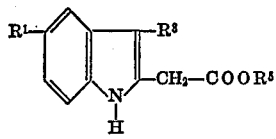

with an acyl halide derivative of the formula, $$R^2\text{—}CO\text{—}Y$$

and further, if necessary, reacting the thus obtained N-substituted 2-indolylacetic acid ester of the formula,

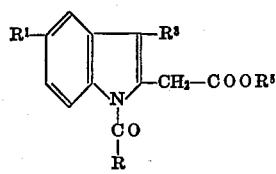

with hydrogen or an acid, in the above formulae $R^1$ being hydrogen, halogen, alkyl having up to 3 carbon atoms or alkoxy having up to 3 carbon atoms; $R^2$ being styryl, unsubstituted or halogen-, lower alkyl- or methylenedioxy-substituted phenyl, or unsubstituted or halogen- or lower alkyl-substituted heterocyclic five- or six-membered ring containing nitrogen, oxygen or sulfur atom; $R^3$ being hydrogen or alkyl having up to 4 carbon atoms; $R^4$ being hydrogen, alkyl having up to 4 carbon atoms, benzyl or 2-tetrahydropyranyl; $R^5$ being the same alkyl, benzyl or 2-tetrahydropyranyl as identified for $R^4$; and Y being halo-gen. These agents are novel compounds excluding those in which $R^2$ is halogen- or lower alkyl-substituted phenyl.

This application is a continuation of Ser. No. 861,449, filed Sept. 26, 1969, now abandoned.

This invention relates to a novel process for producing 2-indolylacetic acid derivatives. More particularly, it relates to a process for producing 1-acyl-2-indolylacetic acid derivatives represented by the Formula I,

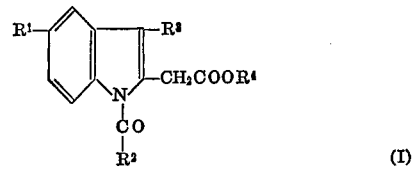

wherein $R^1$ is hydrogen, halogen, alkyl having up to 3 carbon atoms or alkoxy having up to 3 carbon atoms; $R^2$ is styryl, unsubstituted or halogen-, lower alkyl- or methylenedioxy-substituted phenyl, or unsubstituted or halogen- or lower alkyl-substituted five- or six-membered heterocyclic ring containing nitrogen, oxygen or sulfur atom; $R^3$ is hydrogen or alkyl having up to 4 carbon atoms; and $R^4$ is hydrogen, alkyl having up to 4 carbon atoms, benzyl or 2-tetrahydropyranyl.

The compounds obtained in accordance with this invention have remarkable anti-inflammatory, analgesic and anti-pyretic actions and are quite useful. And they contain novel compounds.

One object of the present invention is to provide a novel process for producing these useful 2-indolylacetic acid derivatives advantageously from a commercial point of view.

Another object of the present invention is to provide novel 2-indolylacetic acid derivatives useful as anti-inflammatory, analgesic and anti-pyretic agents.

Other objects will be apparent from the following description.

In accordance with this invention, the 1-acyl-2-indolylacetic acid compounds represented by the Formula 1 are prepared by reacting an $N^1$-acyl-phenylhydrazine compound represented by the Formula II,

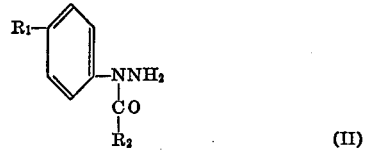

wherein $R^1$ and $R^2$ are as defined hereinbefore, or acid-addition salt thereof, with an aliphatic ketoacid derivative represented by the Formula III, $$R^3\text{—}CH_2\text{—}CO\text{—}CH_2\text{—}COOR^4 \qquad (III)$$

wherein $R^3$ and $R^4$ are as defined hereinbefore.

This reaction is preferably conducted by heating the reactants in the presence or absence of an acidic condensing agent. The reaction proceeds smoothly even when no solvent is used, but sometimes it is preferable to use a suitable organic solvent such as acetic acid, formic acid, propionic acid, cyclohexane, n-hexane, benzene, toluene, dioxane, ethyl acetate, methanol, ethanol or t-butanol. A condensing agent is not always required in the reaction, when an acid-addition salt of $N^1$-acyl-phenyl-hydrazine Compound II is used. However, there are used generally a condensing agent, such as hydrogen chloride, sulfuric acid, phosphoric acid, zinc chloride, copper chloride, copper powder, Boron trifluoride, polyphosphoric acid or the like, by employment of which a favorable result may be given. The reaction is carried out at a temperature within a range of from 50° to 180° C., preferably from 65° to 95° C. The above-mentioned reaction solvents, reaction temperatures and condensing agents are illustrative and the invention is not limited thereto. The following compounds, for example, are easily prepared in good yield according to the process of the present invention.

1-p-chlorobenzoyl-3-methyl-5-methoxy-2-indolyl acetic acid
1-p-chlorobenzoyl-3-methyl-5-chloro-2-indolylacetic acid
1-p-chlorobenzoyl-3,5-dimethyl-2-indolyacetic acid
Methyl 1-p-chlorobenzoyl-3-methyl-5-methoxy-2-indolylacetate
Ethyl 1-p-chlorobenzoyl-3-methyl-5-methoxy-2-indolyl-acetate
t-Butyl 1-p-chlorobenzoyl-3-methyl-5-methoxy-2-indolylacetate
Benzyl 1-p-chlorobenzoyl-3-methyl-5-methoxy-2-indolylacetate
Ethyl 1-p-methylbenzoyl-3-methyl-5-methoxy-2-indolyl-acetate
1-cinnamoyl-3-methyl-5-methoxy-2-indolylacetic acid
Ethyl 1-cinnamoyl-3-methyl-5-methoxy-2-indolylacetate
Ethyl 1-p-chlorobenzoyl-3-ethyl-5-methoxy-2-indolylacetate
Ethyl 1-p-chlorobenzoyl-3-n-propyl-5-methoxy-2-indolylacetate
Ethyl 1-(3',4'-methylenedioxybenzoyl)-3-methyl-5-methoxy-2-indolylacetate

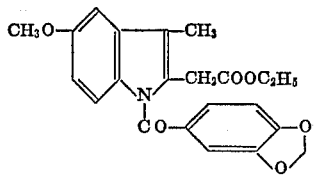

1-cinnamoyl-3-ethyl-5-methoxy-2-indolylacetic acid
2-tetrahydropyranyl (1-cinnamoyl-3-methyl-5-methoxy-2-indolyl)acetate
1-nicotinoyl-3-methyl-5-methoxy-2-indolylacetic acid
1-nicotinoyl-3-methyl-5-chloro-2-indolylacetic acid
1-nicotinoyl-3,5-dimethyl-2-indolylacetic acid
Methyl 1-nicotinoyl-3-methyl-2-indolylacetate
Ethyl 1-nicotinoyl-3-methyl-2-indolylacetate
t-Butyl 1-nicotinoyl-3-methyl-2-indolylacetate
Benzyl 1-nicotinoyl-3-methyl-2-indolylacetate
2-tetrahydropyranyl (1-nicotinoyl-3-methyl-5-methoxy-indolyl)acetate
1-isonicotinoyl-3-methyl-5-methoxy-2-indolylacetic acid
Ethyl 1-isonicotinoyl-3-methyl-5-methoxy-2-indolyl-acetate
Ethyl 1-nicotinoyl-3-ethyl-5-methoxy-2-indolylacetate
Ethyl 1-nicotinoyl-3-methyl-5-ethoxy-2-indolylacetate
Ethyl 1-nicotinoyl-3-methyl-2-indolylacetate
1-(2'-furoyl)-3-methyl-5-methoxy-2-indolylacetic acid
1-(2'-thenoyl)-3-methyl-5-methoxy-2indolylacetic acid
Ethyl 1(2'-furoyl)-3-methyl-5-methoxy-2-indolylacetate
Ethyl 1-(2'-thenoyl)-3-methyl-5-methoxy-2-indolyl-acetate
Ethyl 1-(2'-pyridylcarbonyl)-3-methyl-5-methoxy-2-indolylacetate
Ethyl 1-(N-methyl-3'-piperidylcarbonyl)-3-methyl-5-methoxy-2-indolylacetate
Ethyl 1-(5'-chloro-2'-thenoyl)-3-methyl-5-methoxy-2-indolylacetate In accordance with this invention, 1-acyl-2-indolylacetate derivatives represented by the Formula IV,

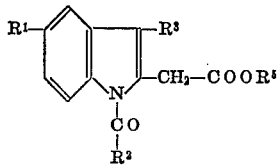

wherein $R^1$, $R^2$ and $R^3$ are as defined above, and $R^5$ is same alkyl having up to 4 carbon atoms, benzyl or 2-tetrahydropyranyl as defined for $R^4$, are also prepared by reacting N-unsubstituted 2-indolyl acetic acid ester derivatives represented by the Formula V:

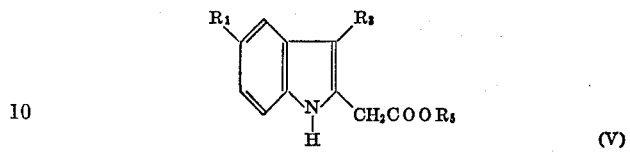

wherein $R^1$, $R^3$ and $R^5$ are as defined hereinbefore, with an acyl halide derivative represented by the Formula VI:

$$R^2—CO—Y \qquad (VI)$$

wherein $R^2$ is as defined hereinbefore and Y is halogen.

It is preferred to carry out the acylation reaction by treating the N-unsubstituted 2-indolylacetic acid ester (V) with a strongly basic agent such as alkali metal, alkali metal hydride, alkali metal amide, alkali metal alkoxide or the like and then with acyl halide (VI) in an inert organic reaction medium. It is preferred to employ a solvent such as dimethylformamide, benzene, toluene, xylene, dioxane, tetrahydrufuran dimethoxyethane or the like. This reaction is preferably carried out at a temperature ranging from —20° to +30° C., although higher temperatures may be employed.

The following compounds, for example, are prepared according to the process of the present invention.

Methyl 1-p-chlorobenzoyl-3-methyl-5-methoxy-2-indolylacetate
Ethyl 1-p-chlorobenzoyl-3-methyl-5-methoxy-2-indolylacetate
t-Butyl 1-p-chlorobenzoyl-3-methyl-5-methoxy-2-indolyl-acetate
Benzyl 1-p-chlorobenzoyl-3-methyl-5-methoxy-2-indolylacetate
Ethyl 1-p-methylbenzoyl-3-methyl-5-methoxy-2-indolylacetate
Ethyl 1-cinnamoyl-3-methyl-5-methoxy-2-indolylacetate
Ethyl 1-p-chlorobenzoyl-3-ethyl-5-methoxy-2-indolylacetate
Ethyl 1-p-chlorobenzoyl-3-n-propyl-5-methoxy-2-indolylacetate
Benzyl 1-(3',4'-methylenedioxybenzoyl)-3-methyl-5-methoxy-2-indolylacetate

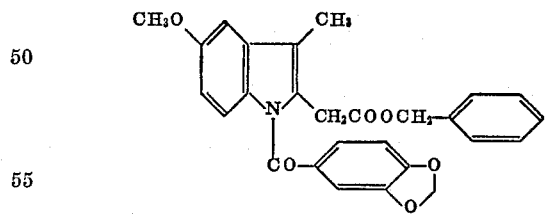

Ethyl 1-cinnamoyl-3-ethyl-5-methoxy-2-indolylacetic acetate
2-tetrahydropyranyl (1-cinnamoyl-3-methyl-5-methoxy-2-indolyl)acetate
t-Butyl 1-cinnamoyl-3-methyl-5-methoxy-2-indolylacetate
Benzyl 1-isonicotinoyl-3-methyl-5-methoxy-2-indolylacetate
Ethyl 1-isonicotinoyl-3-methyl-5-methoxy-2-indolylacetate
Ethyl 1-nicotinoyl-3-ethyl-5-methoxy-2-indolylacetate
Ethyl 1-nicotinoyl-3-methyl-5-ethoxy-2-indolylacetate
Ethyl 1-nicotinoyl-3-methyl-2-indolylacetate
Benzyl 1-(2'-furoyl)-3-methyl-5-methoxy-2-indolylacetate
Benzyl 1-(2'-thenoyl)-3-methyl-5-methoxy-2-indolylacetate
Ethyl 1-(2'-furoyl)-3-methyl-5-methoxy-2-indolylacetate Ethyl 1-(2'-thenoyl)-3-methyl-5-methoxy-2-indolylacetate
Ethyl 1-(2'-pyridylcarbonyl)-3-methyl-5-methoxy-2-indolylacetate
Ethyl 1-(N-methyl-3-pyperidylcarbonyl)-3-methyl-5-methoxy-2-indolylacetate
Ethyl 1-(5'-chloro-2'-thenoyl)-3-methyl-5-methoxy-2-indolylacetate
Methyl 1-nicotinoyl-3-methyl-2-indolylacetate
Ethyl 1-nicotinoyl-3-methyl-2-indolylacetate
t-Butyl 1-nicotinoyl-3-methyl-2-indolylacetate
Benzyl 1-nicotinoyl-3-methyl-2-indolylacetate
2-tetrahydropyranyl (1-nicotinoyl-3-methyl-5-methoxy-2-indolyl)acetate Further, in the present invention, 1-acyl-2-indolylacetic acid derivatives represented by the Formula VII

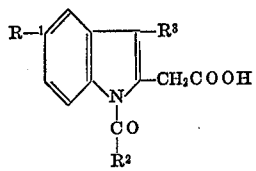

(VII)

wherein $R^1$, $R^2$ and $R^3$ are as defined hereinbefore, are obtained by converting a 1-acyl-2-indolylacetate derivative represented by the Formula IV.

That is, a benzyl ester of 2-indolyl acetic acid is converted to the corresponding free acid by hydrogenolitic removal of the benzyl group. Alternatively, a t-butyl ester or a 2-tetrahydropyranyl ester is converted to the corresponding free acid by heating in the presence of a catalytic amount of an arylsulfonic acid or an other acid, preferably at 30°–120° C.

By this method, the following compounds, for example, are prepared.

1-(3',4'-methylenedioxybenzoyl)-5-methoxy-2-indolylacetic acid
1-(3',4'-methylenedioxybenzoyl)-3-methyl-5-methoxy-2-indolylacetic acid
1-(3',4'-methylenedioxybenzoyl)-3-ethyl-5-methoxy-2-indolylacetic acid
1-cinnamoyl-3-methyl-5-methoxy-2-indolylacetic acid
1-cinnamoyl-3-ethyl-5-methoxy-2-indolylacetic acid
1-cinnamoyl-3-methyl-5-ethoxy-2-indolylacetic acid
1-cinnamoyl-3,5-dimethyl-2-indolylacetic acid
1-(p-chlorobenzoyl)-5-methoxy-2-indolylacetic acid
1-(p-chlorobenzoyl)-3-methyl-5-methoxy-2-indolylacetic acid
1-(p-chlorobenzoyl)-3-ethyl-5-methoxy-2-indolylacetic acid
1-(p-methylbenzoyl)-3-methyl-5-methoxy-2-indolylacetic acid
1-benzoyl-3-methyl-5-methoxy-2-indolylacetic acid
1-(p-bromobenzoyl)-3-methyl-5-methoxy-2-indolylacetic acid
1-(p-chlorobenzoyl)-3-methyl-5-ethoxy-2-indolylacetic acid
1-(p-chlorobenzoyl)-3,5-dimethyl-2-indolylacetic acid
1-(p-chlorobenzoyl)-3-methyl-5-chloro-2-indolylacetic acid
1-(p-chlorobenzoyl)-3-methyl-2-indolylacetic acid
1-cinnamoyl-3-methyl-5-chloro-2-indolylacetic acid
1-cinnamoyl-3-methyl-2-indolylacetic acid
1-cinnamoyl-3-ethyl-5-ethoxy-2-indolylacetic acid
1-nicotinoyl-3-methyl-5-methoxy-2-indolylacetic acid
1-isonicotinoyl-3-methyl-5-methoxy-2-indolylacetic acid
1-(2'-furyl)-3-methyl-5-methoxy-2-indolylacetic acid
1-(2'-thenoyl)-3-methyl-5-methoxy-2-indolylacetic acid Among the 2-indolylacetic acid derivatives obtained by the above-mentioned process of the present invention, there are contained novel compounds, which are presented by the formula,

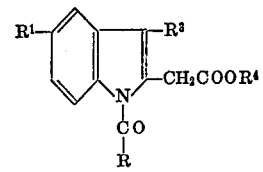

wherein $R^1$, $R^3$ and $R^4$ are as defined before, and $R^4$ is styryl, phenyl, methylenedioxy-phenyl or unsubstituted or halogen- or lower alkyl-substituted heterocyclic five- or six-membered ring containing nitrogen, oxygen or sulfur atom.

The present invention will be further explained in detail by referring to the following examples. However, these examples are illustrative, and the scope of the invention is not limited thereby.

EXAMPLE 1

A mixture of 3.0 g. of $N^1$-cinnamoyl p-methoxyphenylhydrazine hydrochloride, 2.0 g. of ethyl propionylacetate and 10 ml. of acetic acid was heated at 70°–80° C. for 2 hours under stirring. After cooling, the reaction mixture was poured into 100 ml. of cold water and extracted with 100 ml. of ether. The etheral extract was washed thoroughly with water, dried over magnesium sulfate and evaporated to dryness under reduced pressure. The residual solid was recrystallized from aqueous ethanol to give yellow crystals of ethyl 1-cinnamoyl-3-methyl-5-methoxy-2-indolylacetate, M.P. 123°–124° C.

By a method similar to that of Example 1, the following 1-acyl-2-indolyl acetic acid derivatives were obtained.

EXAMPLE 2

Ethyl 1-p-chlorobenzoyl-3-methyl-5-methoxy-2-indolylacetate, M.P. 102°–103° C.

EXAMPLE 3

Ethyl 1-(3,4-methylenedioxybenzoyl)-3-methyl-5-methoxy-2-indolylacetate, M.P. 107°–108° C.

EXAMPLE 4

Ethyl 1-nicotinoyl-3-methyl-5-methoxy-2-indolylacetate, M.P. 86°–87° C.

EXAMPLE 5

Benzyl 1-p-chlorobenzoyl-3-methyl-5-methoxy-2-indolylacetate, a thick yellow oil. I.R. $\lambda_{max}$. 5.75$\mu$, 5.96$\mu$.

EXAMPLE 6

To a stirred solution of 5.0 g. of ethyl 3-methyl-5-methoxy-2-indolylacetate in 90 ml. of dimethylformamide was added 0.6 g. of sodium hydride in portions under cooling with ice. After 2 hours, 4.4 g. of p-chlorobenzoyl chloride was added dropwise during 10 minutes, and the mixture was stirred for 4 hours at room temperature. The reaction mixture was then poured into 600 ml. of cold water, extracted twice with each of 100 ml. of benzene. The combined organic layer was washed thoroughly with water, dried over magnesium sulfate and evaporated to a residue. The residue was agitated with 100 ml. of ether, and the insoluble material was filtered off. The etheral solution was evaporated to a residue, which was crystallized by leaving in a refrigerator over night. The product thus obtained was recrystallized from aqueous ethanol to give ethyl 1-p-chlorobenzoyl-3-methyl-5-methoxy-2-indolylacetate, M.P. 102°–103° C.

By a method similar to that of Example 6, the following 1-acyl-2-indolyl acetic acid derivatives were obtained.

EXAMPLE 7

Ethyl 1-cinnamoyl-3-methyl-5-methoxy-2-indolylacetate, M.P. 123°–124° C.

EXAMPLE 8

Ethyl 1-nicotinoyl-3-methyl-5-methoxy-2-indolylacetate, M.P. 86°–87° C.

EXAMPLE 9 t-Buthyl 1-cinnamoyl-3-methyl-5-methoxy-2-indolylacetate, a yellow viscous oil.

EXAMPLE 10

Ethyl 1-(3',4'-methylenedioxybenzoyl)-3-methyl-5-methoxy-2-indolylacetate, M.P. 108°–109° C.

EXAMPLE 11

A mixture of 2.0 g. of benzyl 1-p-chlorobenzoyl-3-methyl-5-methoxy-2-indolylacetate, 0.6 g. of 5% palladium on carbon catalyst and 25 ml. of tetrahydrofuran was shaken under hydrogen at room temperature for 1 hour. The mixture was filtered and the filtrate was evaporated to dryness under reduced pressure. The solidal residue was recrystallized from ether-petroleum ether to give 1-p-chlorobenzoyl-3-methyl-5-methoxy-2-indolylacetic acid, M.P. 162°–163° C.

According to the procedure similar to the that described above, following compounds are obtained.

1-(3',4'-methylenedioxybenzoyl)-3-methyl-5-methoxy-2-indolylacetic acid
1-nicotinoyl-3-methyl-5-methoxy-2-indolylacetic acid
1-(2'-fuoryl)-3-methyl-5-methoxy-2-indolylacetic acid
1-(2'-thenoyl)-3-methyl-5-methoxy-2-indolylacetic acid
1-cinnamoyl-2-methyl-5-methoxy-2-indolylacetic acid

EXAMPLE 12

A mixture of 1 g. of t-butyl 1-p-chlorobenzoyl-3-methyl-5-methoxy-2-indolylacetate, 30 ml. of benzene and 0.1 g. of p-toluenesulfonic acid was heated under reflux for 2 hours. After cooling, the reaction mixture was washed with water, dried over anhydrous magnesium sulfate and evaporated under reduced pressure to an oily residue. The residue was crystallized on treatment of ether-petroleum ether and recrystallized from ether-petroleum ether to give 1-p-chlorobenzoyl-3-methyl-5-methoxy-2-indolyl acetic acid, M.P. 162°–163° C.

What is claimed is:

1. A 2-indolylacetic acid derivative represented by the formula,

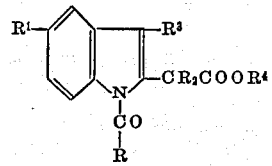

wherein R is styryl, phenyl, methylenedioxyphenyl or unsubstituted or halogen- or lower alkyl-substituted pyridine, thiophene or furan ring; $R^1$ is hydrogen, halogen, alkyl having up to 3 carbon atoms or alkoxy having up to 3 carbon atoms; $R^3$ is hydrogen or alkyl having up to 4 carbon atoms; and $R^4$ is hydrogen, alkyl having up to 4 carbon atoms, benzyl or 2-tetrahydropyranyl.

2. The 2-indolylacetic acid derivative of claim 1 which is ethyl 1-cinnamoyl-3-methyl-5-methoxy-2-indolylacetate.

3. The 2-indolylacetic acid derivative of claim 1 which is ethyl 1-nicotinyl-3-methyl-5-methoxy-2-indolylacetate.

4. The 2-indolylacetic acid derivative of claim 1 which is ethyl 1-(3,4-methylene-dioxybenzoyl)-3-methyl-5-methoxy-2-indolylacetate.

References Cited

UNITED STATES PATENTS 3,535,334   10/1970   Yamamoto et al. __ 260—240 J X

OTHER REFERENCES

Elderfield; Heterocyclic Compounds, vol. 3, pages 8–9, John Wiley and Sons (1952).

Chemical Abstracts, vol. 70, abstract No. 68,149f, Apr. 14, 1969 (abstract of South African Pat. 69/2,638).

JOHN D. RANDOLPH, Primary Examiner

U.S. Cl. X.R.

424—266, 274; 260—295.5 B, 326.12 A, 326.13 A, 332.2 R, 340.5, 345.7, 483